Jan. 19, 1954  V. J. SIGODA  2,666,483
PINKING MECHANISM
Filed Nov. 13, 1947  2 Sheets-Sheet 1
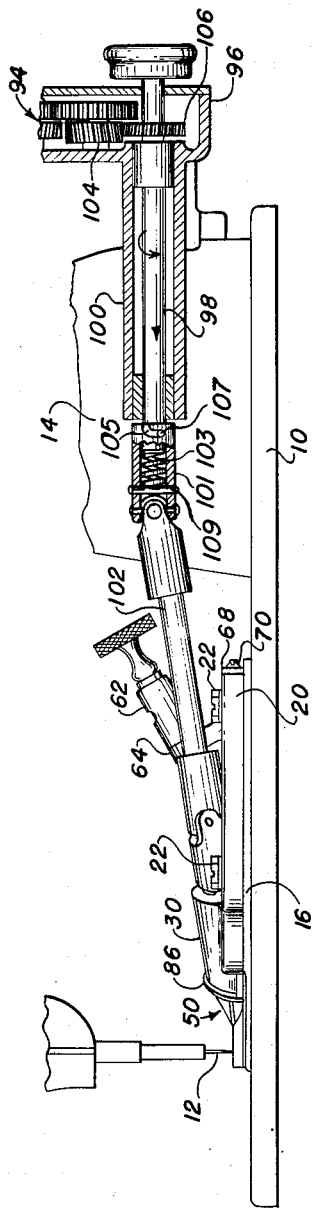
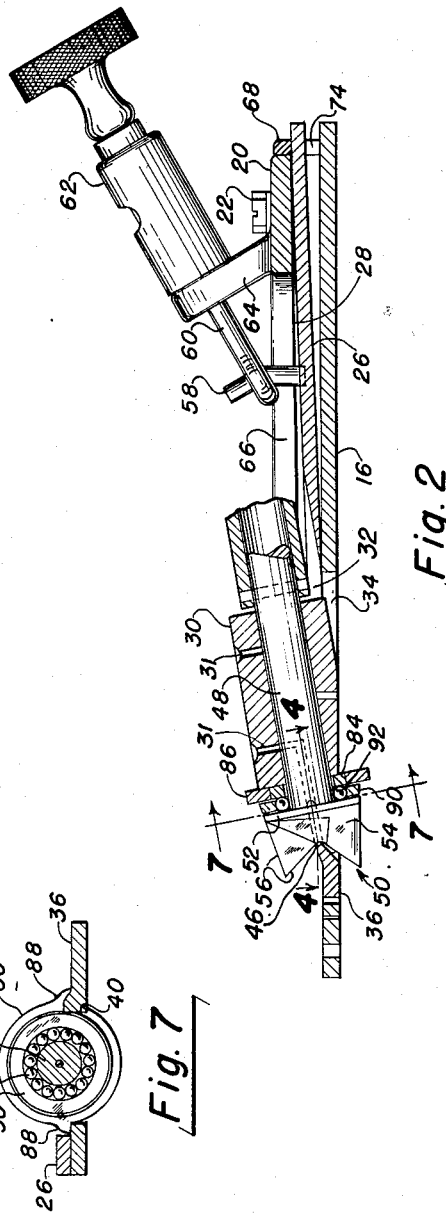
Inventor
Victor J. Sigoda
By Strauch & Hoffman
Attorneys

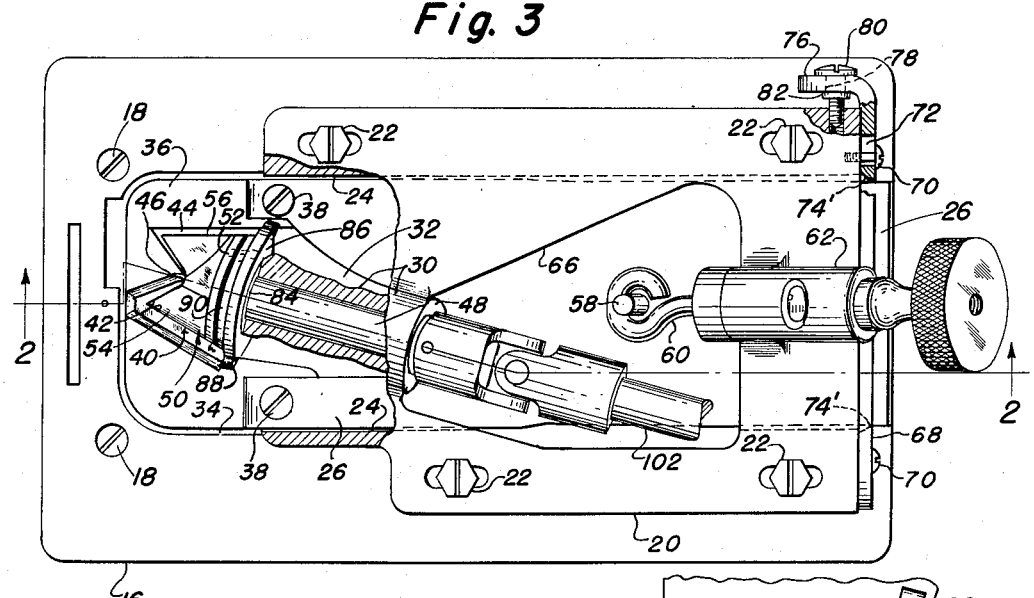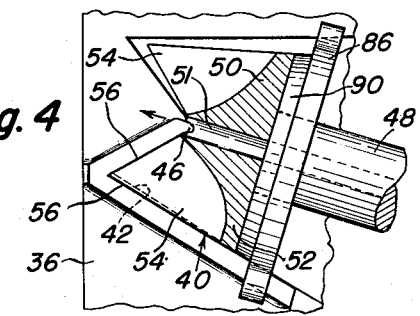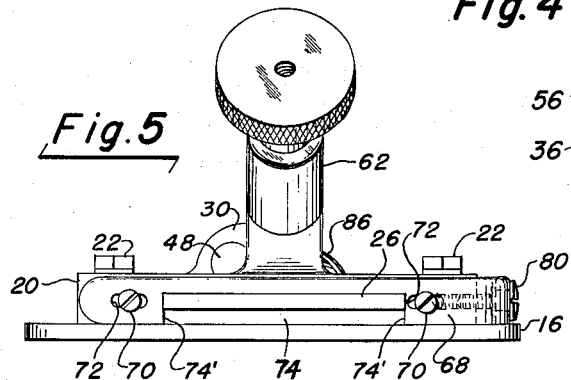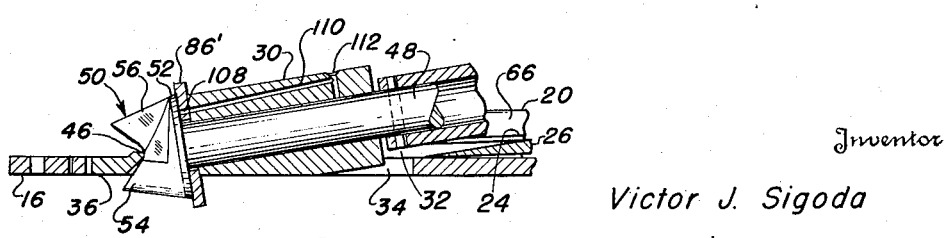

Patented Jan. 19, 1954

2,666,483

UNITED STATES PATENT OFFICE 2,666,483

PINKING MECHANISM

Victor J. Sigoda, Great Neck, N. Y., assignor to Man-Sew Corporation, New York, N. Y., a corporation of New York Application November 13, 1947, Serial No. 785,766

24 Claims. (Cl. 164—17.5)

This invention relates to pinking mechanism and has for its general object and purpose to provide certain practical improvements in the mounting of the ledger blade and cooperating rotary cutter disclosed in my pending application for patent, Serial Number 630,635, filed November 24, 1945, now Patent 2,540,355, granted February 6, 1951, assigned to Man-Sew Corporation.

One of the characteristic features of the invention disclosed in said pending application is the provision of a bearing point on the ledger blade urged by a tensioning device connected with said blade into bearing contact with the rotary cutter adjacent its axis of rotation, whereby the shearing edges on the blade are normally positioned with respect to the shearing edges of the rotary cutter to insure a clear, sharp pinking cut in the coaction of the shearing edges on the rotary cutter and relatively stationary ledger blade. In this prior construction, the ledger blade was mounted in suitable guide means for longitudinal sliding movement and closely held thereby against either transverse or vertical movement relative to the rotary cutter. It was found that slight mechanical inaccuracies in manufacture, or wear of the cooperating movable and stationary shearing edges, might result in a defective pinking cut due to misalignment of the shearing edges of the movable cutter and stationary blade. Further, since the axis of the rotary cutter is disposed at a longitudinal inclination relative to the plane of the ledger blade, the thrust pressure of the blade against the rotary cutter resulted in excessive friction against the cutter bearing and also had a tendency to create undesirable frictional resistance to sliding movement of the ledger blade at its opposite edges which were closely confined in the guideways or channels of the guide member upon which the rotary cutter is mounted.

It is accordingly a primary object of the invention to provide a means for mounting the cooperating shearing elements so that slight inaccuracies in manufacture or due to incidental wear will not impair the proper functioning of the device. Therefore, a relatively floating or self-aligning mounting of these elements is one of the important features of my present improvements. To further implement this object and to prevent the possible overriding of the coacting shearing edges of said elements, by reason of such floating mounting, I have provided novel means for limiting relative angular movement between said elements to accurately maintain a predetermined coacting relationship between the shearing edges thereof. This may comprise a flange portion on one of said elements mounted to rotate about a fixed axis and having constant contact with one shearing edge of the other relatively stationary element. Or, simple and easily operable means for transversely adjusting the ledger blade relative to the guide may be employed, or as shown herein, both may be used conjointly.

It is therefore another object of the present invention to provide greater flexibility in the mounting of the ledger blade to accurately position the shearing edges thereof for proper cooperation with the teeth of said rotary cutter.

It is also an important object of the invention to provide an improved mounting of the ledger blade so that in the event the tooth of the movable pinking member should ever tend to override the shearing edges of the blade the latter may have a slight longitudinal and rocking movement at its supporting fulcrum relative to said pinking member.

A further object of the invention resides in an improved construction of the ledger blade guide so that under the pull of the tensioning device, the blade is held for sliding movement in the guide at a longitudinal inclination with respect to the base, whereby the direction of thrust pressure of the bearing point on the blade against the rotary cutter is more nearly parallel with the axis of rotation of said cutter and, in the shearing or cutting action, the restraining influence of the tensioning device to movement of the blade relative to the cutter will be substantially unaffected by frictional resistance to sliding movement of the blade.

An additional object of the invention resides in the provision of means in the power operated gearing for the rotary cutter to transmit axial thrust to the latter in opposition to the blade tensioning means to partially offset the axial thrust transmitted from the latter through the blade to the cutter in the opposite direction, and thus minimize frictional resistance in the cutter bearing.

Still another object of the invention, in one of its embodiments, resides in the provision of a lint deflecting member surrounding the rotary cutter shaft and having means coacting with the ledger blade to prevent rotation of said member, together with an anti-friction radial and thrust bearing interposed between said deflecting member and a back flange formed on the cutter head. In another embodiment of the invention, I may provide the shaft bearing on the guide member and the deflecting member with registering passages through which a lubricating oil film may be distributed between the contacting surfaces of said deflecting member and the flange on the cutter head.

The invention further comprehends a pinking mechanism having the several novel improvements as above characterized, which insures accurately pinked fabric products of high quality, and in which the several mechanical parts are of simple, rugged and durable structural form, conducing to low production and maintenance costs, and high speed operating efficiency.

With the above and other subordinate objects in view, the invention comprises the improved pinking mechanism and the construction and relative arrangement of its several parts, as will hereinafter be more fully described, illustrated in the accompanying drawings, and subsequently incorporated in the subjoined claims.

In the drawings, wherein I have shown one simple and practical embodiment of the invention and in which similar reference characters designate corresponding parts throughout the several views:

Figure 1 is a side elevation partly in section, showing one embodiment of my improved pinking mechanism, in the form of an attachment for sewing machines;

Figure 2 is a longitudinal sectional view taken substantially on the line 2—2 of Figure 3;

Figure 3 is a top plan view, a part of the ledger blade guide and cutter shaft bearing being shown in section;

Figure 4 is an enlarged horizontal section taken substantially on the line 4—4 of Figure 2;

Figure 5 is an end elevation;

Figure 6 is a detail fragmentary side elevation showing the means for transversely adjusting the ledger blade;

Figure 7 is a transverse sectional view taken substantially on the line 7—7 of Figure 2; and Figure 8 is a detail fragmentary vertical section through the cutter shaft bearing showing a slightly modified embodiment of one feature of the present invention.

For convenient illustration, I have shown my present improvements embodied in the sewing machine attachment of application Serial Number 630,635, now Patent 2,540,355, whereby, in seaming together two layers of fabric material by the stitching mechanism, the rotatable cutter is operated in timed relation therewith to progressively pink the projecting edge portions of the fabric layers. I have, therefore, shown in Figure 1 of the drawings, the bed plate 10 of the machine and the vertically reciprocating stitch-forming needle 12, the latter being operated by conventional mechanism including a main driving shaft mounted on the sewing machine arm, partially indicated at 14. Of course, the usual four-motion feed dog and operating means therefor (not shown) is mounted below the bed 10, and in cooperation with the customary presser foot, intermittently feeds the fabric material over the throat plate mounted in the upper surface of the base plate 10.

My improved pinking mechanism is carried by the base plate 16, which is suitably attached to the upper surface of the bed plate 10, as by means of the screws 18. At one of its ends, this base plate is formed with a needle receiving opening and slots registering with the usual needle opening and feed dog slots of the throat plate of the machine.

Upon the base plate 16, the combined cutter carrying member and ledger blade guide 20 is mounted by means of the screws 22 extending through elongated slots in opposite side flanges of said member and threaded in the base plate. At its opposite sides, the member 20 is also formed with longitudinally extending guideways or rabbets 24 for the longitudinal edge portions of a ledger blade 26. From reference to Figure 3 of the drawings, it will be noted that the distance between the outer vertical walls of these guideways is somewhat greater than the width of the ledger blade 26 so that the latter may have limited transverse movement in said guideways. From reference to Figure 2 of the drawings, it will further be noted that the lower faces of the top walls of these guideways are longitudinally inclined upwardly from the front to the rear end of the member 20, as indicated at 28.

At its forward end, the guide member 20 is formed with a cylindrical cutter shaft bearing 30, the axis of which is obliquely inclined transversely and longitudinally with respect to said member. The lower portion of this bearing extends through an opening 32 in the forward end portion of the ledger blade and within a registering opening 34 in the base plate 16.

The forward end of the blade 26 is provided with a nose-piece 36 which may be either integrally formed with said blade or attached thereto by means of suitable screws 38 for convenience in resharpening the shearing edges of the nose piece. This nose piece is disposed in a lower plane than the blade 26 within the forward end of the opening 34 in base plate 16, and is provided in opposed relation to the blade 26 with a V-shaped notch 40, preferably defined by upstanding ribs or lands formed on the top surface of the nose piece 36, which provides inner opposed shearing edges 42 with which the shearing edges on the teeth of the rotary cutter to be presently described are adapted to coact. The novel features of this ledger blade are not herein claimed, since it forms the subject matter of a second copending application by me, Serial Number 706,229, filed October 28, 1946, assigned to Man-Sew Corporation. As disclosed therein, the nose piece 36 is also provided with a second notch 44 adjoining the notch 40, the end of the rib or land along one side of the latter notch forming a reinforced bearing point 46 between said notches for pressure engagement with the rotary cutter member axially thereof, the teeth of which move freely through the notch 44 in non-contacting relation to the edges thereof.

In the bearing 30, the cutter shaft 48 is journalled and carries at its forward end a cutter head 50, which may either be integral with the shaft or separately formed and suitably fixed thereto. As herein shown, this cutter head is provided with a back flange 52, upon the front face of which the laterally projecting, triangularly shaped cutter teeth 54 are formed, and as will be seen from reference to Figure 2 of the drawings, one of the shearing edges 56 of each tooth, when positioned above the ledger blade, inclines upwardly from the root or heel of the tooth to its point of intersection with the other shearing edge 56 of said tooth, while the latter shearing edge is inclined upwardly from the point or apex of the tooth to the heel thereof so that said tooth edges 56 approach the fabic at reverse vertically oblique angles. Thus it will be understood that in each revolution of the cutter, as the teeth thereof successively move downwardly through the pinking notch 40 of the ledger blade, one of the shearing edges 56 on each tooth will first coact with one shearing edge 42 of the notch 40 to progressively cut the material along one side of said notch from the edge of the material to the apex of the cutter tooth, followed by the progressive coaction between the other shearing edge 56 of the cutter tooth and the other shearing edge 42 of the notch in the ledger blade to cut through the material outwardly from the apex of the tooth through the edge of the material, thus excising a V-shaped part of the material and forming the pinking notch in the edge thereof. This novel method and means of pinking, which produces a more uniformly accurate size of the pinking notches is like-wise not claimed herein, since it is fully disclosed and claimed in my Patent 2,420,331, granted May 13, 1947, assigned to Man-Sew Corporation.

Preferably, as clearly shown in Figure 4, the cutter head 50 is provided with an axial bore 51 and fulcrum point 46 on the ledger blade may have bearing point contact adjacent the forward end of this bore at one side thereof.

The blade 26 adjacent its rear end, and in longitudinal alignment with the base or point of the pinking notch 40 in the ledger blade has an upstanding stud 52 fixed thereto, over which an eye on the lower end of rod 60 of a tensioning device 62 is loosely engaged. This tensioning device is mounted upon a bracket arm 64 integral with or secured to the guide member 20, and projecting over an opening 66 in said guide member through which the stud 58 projects. For the purposes of the present explanation, further detailed description of the tensioning device 62 is not required, since it is fully described and claimed in another copending application Serial Number 687,455, filed by me on July 31, 1946, now Patent 2,541,110, granted February 13, 1951, assigned to Man-Sew Corporation. It will suffice to state that the tensioning device 62 may be properly adjusted to maintain a rearward tensional pull on the blade 26 and its nose piece 36, to yieldingly hold the bearing point or projection 46 on the latter in pressure contact with the cutter member 50, thus normally positioning the shearing edges 42 for proper coaction with the shearing edges 56 of the cutter teeth.

As seen in Figure 2, the tensioning device 62 also yieldingly holds the rear end of blade 26 at its opposite side edges in contact with the walls 28 of the guideways 24, and thus supports the ledger blade in a longitudinally inclined plane relative to the base plate 16, so that the thrust pressure of the bearing point 46 against the cutter member 50 is more nearly directed in parallel relation with the axis of rotation of said cutter member, thereby tending to minimize frictional resistance in bearing 30 to free rotation of the cutter shaft 48.

It will further be observed that owing to this yielding support of the ledger blade between its rear end and the bearing point 46 and clearance in the guideways 24, in the event that the cutting edges of teeth 54 should ever tend to override the shearing edges 42 of the ledger blade, the latter may have a slight rocking and longitudinal shifting motion at the fulcrum point 46, thus relieving stress forces which might otherwise result in mutilation or breakage of the coacting parts.

Upon the rear end of the guide member 20, an adjusting bar 68 is mounted for movement transversely thereof by means of the spaced screws 70 extending through elongated slots 72 in said bar and threaded in the guide member. This bar in the lower edge thereof is provided with a slot or recess 74 through which the rear end of the ledger blade 26 extends. At the opposite ends of this slot the bar 68 is provided with vertical knife edges 74' with which the side edges of the ledger blade 26 have sliding and rocking contact.

At one of its ends, the bar 68 is provided with a forwardly extending terminal portion 76 having a notch 78 in its lower edge rotatably receiving the adjusting screw 80 threaded in the guide member 20. The flange 82 and the screw head at the opposite sides of the terminal portion 76 of bar 68 prevent axial movement of the screw relative to said bar. Thus when the clamping screws 70 are loosened, by rotating the adjusting screw 80 in the proper direction, bar 68 is transversely shifted on the end of the guide member 20, thereby rocking the ledger blade or pivotally adjusting the same transversely between the side walls of the guideways 24 from its point of fulcrum bearing 46 with the rotary cutting member 50 to establish a normal angular relationship between the shearing edges 42 on the blade and the edges of the cutter teeth 54. It will be understood that the eye opening at the lower end of rod 60 is transversely elongated sufficiently to permit the slight movement of the rod 58 relative to said eye, which occurs in the transverse pivotal adjustment of the ledger blade relative to the tensioning device. After such adjustment has been made, the screws 70 are then tightened to rigidly clamp and hold the adjusting bar 68 in fixed position relative to guide member 20. In this manner, the ledger blade may be easily and quickly adjusted to compensate for minor mechanical inaccuracies or wear, and accurately position the shearing edges 42 thereof so that the edges of the teeth on the rotary cutter 50 will properly coact therewith to effect a clean sharp pinking cut. It will thus be seen that the ledger blade is supported in guide member 20 at longitudinally spaced points by the fulcrum bearing 46 on the ledger blade, the back flange 52 on the cutter and rod 60 of the tensioning device for transverse pivotal adjustment in its own plane, and also for such slight longitudinal and pivotal movement at the fulcrum axis 43 relative to the cutter and tensioning device as will obviate serious damage to the parts in the event that the cutter teeth should tend to override the shearing edges of the ledger blade.

At the forward end of the cutter shaft bearing 30, a hardened steel thrust washer 84 loosely surrounds the shaft within the opening of an annular lint-deflecting member 86 which is provided at diametrically opposite sides thereof with laterally projecting lugs 88 slidably contacting the upper surface of the ledger blade 26 to prevent rotation of said deflecting member relative to the rotary cutter 50. Between the back flange 52 of the cutter and the deflecting member 86, a second hardened steel washer 90 is arranged and confines the anti-friction balls 92 between the cutter flange 52 and the opposed face of the washer 84. The plate 90 is of slightly less thickness than the diameter of balls 92, so that the axial thrust pressure of the fulcrum bearing 46 on the ledger blade against the rotary cutter is transmitted through balls 92 to the thrust washer 84, thus minimizing frictional resistance created by such axial thrust to the rotation of the cutter 50. The outer peripheral edge of the washer plate 90 is tapered correspondingly to the periphery of the flange 52 on the cutter.

It will be seen that this construction obviates the possibility that the teeth of the rotary cutter may override the shearing edges of the ledger blade due to the floating mounting of the latter. Thus the back flange 52 of the cutter 50 being in contact with the ledger blade could wear a groove in the latter after prolonged use and permit the shearing edge of the blade to slip under the teeth of the cutter 50. This would be particularly true when inferior steels are used. However, the element 90 takes over the function of the flange 52 and prevents such overriding. This element being relatively non-rotating, would contact the shearing edge of the blade after a slight groove is worn by flange 52 and would hold the blade out of contact with flange 52 to prevent such further wear of the blade as would result in overriding. Any further wear will occur in the anti-friction bearing as shaft 48 rotates within the balls 92 and the latter rotate on the internal surface of element 90. As the area of this surface and the shaft 48 is much greater than the contact area between flange 52 and the ledger blade, and the surface speeds are lower, such further wear is greatly minimized. Also some of the thrust of the tension spring assembly is transferred through flange 52 to the bearing. This flange also allows ledger blade 26 to float about the shearing edges of the rotary knife 50 under the tension of the spring assembly 62, to thus automatically establish self-alignment of the cutting edges which is a fundamental purpose of the present improvements.

The adjustment of the bar 68 serves to define or limit the range in which the ledger blade may align itself about the rotary cutter and to shift fulcrum point 46 within the bore 51.

Preferably, bearing 30 is provided with one or more lubricant supply passages 31 for shaft 48, the lubricant flowing downwardly along the shaft to the anti-friction bearing unit. Oil is also supplied to the bearing point 46 of the ledger blade through an axial extension of bore 51 in the shaft 48 which opens on the periphery of the shaft in radial alignment with one of the passages 31.

The cutter shaft 48 may be driven by any suitable power actuated mechanism. In the present instance, as in my pending application Serial Number 630,635, now Patent 2,540,355, granted February 6, 1951, a gear train partially indicated at 94 in the fixed housing 96, transmits rotation at predetermined speeds to shaft 98 journalled in the housing section 100, from a main drive shaft, such as the operating shaft for the sewing machine needle 12. An intermediate shaft 102 flexibly connects shaft 98 with the rear end of the cutter shaft 48 by means of conventional universal joints. As herein shown shaft 102 is connected with shaft 98 by a detachable coupling sleeve 101 having a bayonet slot 105 receiving a coupling pin 107 on shaft 98 and a spring 103 within the sleeve between the end of shaft 98 and a transverse pin 109 at the inner end of the sleeve. Preferably, the gearing 94 includes spiral gears 104 and 106 of opposite hand, mounted in housing 96 and fixed to shaft 98 respectively. Thus, in the rotation of the shaft 98, an axial thrust force will be transmitted in the direction indicated by the arrow in Figure 1 to the cutter shaft 48. This thrust force partially counterbalances the axial thrust of fulcrum bearing 46 on the ledger blade in the opposite direction against the cutter 50, so that the tensioning device 62 will normally function to hold the fulcrum point 46 on the ledger blade in operative contact with cutter member 50 under comparatively low thrust pressure, thus further reducing frictional resistance by the thrust bearing 92 to the free rotation of shaft 48 and the cutter 50.

In Figure 8 of the drawings, I have shown a slight modification whereby the construction may be somewhat simplified by the elimination of the anti-friction radial and thrust bearing for shaft 48 above described. The deflecting washer 80' loosely surrounding shaft 48 may be provided with an opening 108 therein registering with an oil receiving duct 110 opening upon the end face of the bearing 30 and having a radial inlet end portion 112 opening through the top of said bearing. Thus a film of oil of suitable consistency will be distributed between the opposed surfaces of the lint-deflecting member 80' and the rear face of the flange 52 on the rotating cutter 50. It will be noted that due to the vertically oblique inclination of the cutter flange 52 excess lubricating oil will be directed rearwardly below the ledger blade and away from the fabric moving over the shearing edges thereof.

Referring again to Figure 4 of the drawings, in which I have shown one of the cutter teeth at the point thereof in slightly overriding relation to the ledger blade, it will be evident that in the downward movement of the tooth through the pinking notch vertical pressure of the tooth on edge 42 of the blade will cause a slight rocking motion of the ledger blade from the point of bearing contact of the rear end of said edge 42 with the bearing plate 90, accompanied by a forward longitudinal motion of the blade against the resistance of tensioning device 62. Thus the point of the cutter tooth 54 may safely move through the pinking notch without breakage or mutilation of the co-acting edges of the tooth and ledger blade. This highly flexible or floating mounting of the ledger blade with respect to the cutter also provides for a sliding rocking motion of the rear end of the ledger blade relative to the adjusting bar 68 upon such overriding of the cutter teeth and insures a sharp and accurate pinking cut by each of the cutter teeth in the operation thereof upon very fine and sheer fabric materials as well as others of relatively coarse structural characteristics.

In the construction of Figure 8, where the anti-friction bearing unit is not employed, by using properly selected and especially hardened steels for the part 30 of the ledger blade and the rotary cutter, the back flange 52 of the cutter may have sliding bearing contact with the ledger blade with negligible incidental wear.

From the foregoing description and the accompanying drawings, it will be appreciated that by means of the several improvements herein disclosed, the pinking mechanism of my prior pending application is rendered more efficient at high operating speeds for the uniformly accurate pinking of fabric materials with a minimum of waste and without greatly increasing the production cost of such mechanism. Preferably, the cutter shaft 48 is mounted at a horizontal inclination of from 8 to 10 degrees, and the cutter member 50 may be provided with any desired number of pinking teeth. Also, when a single pinking tooth is employed, the cutter shaft may be oscillated instead of being continuously rotated in one direction as herein disclosed. It will further be noted that the several parts of my present improvements are of exceedingly simple and durable structural form, so that continuous operation for long periods of time at low maintenance expense is possible, and the necessity for frequent resharpening of the shearing edges of the ledger blade and cooperating rotary cutting member is obviated.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In pinking mechanism, a ledger blade having shearing edges defining a pinking notch, a member movable in intersecting relation to said blade and having a pinking tooth coacting with the shearing edges of said notch, and means for arcuately adjusting the ledger blade in its own plane relative to said movable member to position the shearing edges of the blade relative to the coacting cutting edges of the pinking tooth.

2. The combination defined in claim 1, in which said blade adjacent to the pinking notch is formed with a supporting fulcrum and is pivotally rocked by said adjusting means to correct the angular relationship of the shearing edges of said notch with respect to the cutting edges of the pinking tooth.

3. The combination as defined in claim 2, together with means mounting said movable member for movement about a horizontally inclined axis, and wherein said supporting fulcrum on the ledger blade has bearing contact with said member axially thereof.

4. In pinking mechanism, a toothed cutter and means mounting said cutter for movement about a horizontally inclined axis, a ledger blade having shearing edges defining a pinking notch and a fulcrum at one side of said notch in bearing contact with said cutter axially thereof, and means guidably supporting said ledger blade in cooperative relation with the cutter including a tensioning device yieldingly resisting movement of the blade out of bearing contact with said cutter and supporting said blade for rocking movement about the fulcrum axis and for longitudinal sliding movement upon shearing contact of the cutter tooth with the edges of the pinking notch.

5. The combination defined in claim 4, together with means coaxial with the cutter at its rear end having bearing contact with one shearing edge of the ledger blade at the open end of said pinking notch.

6. The combination defined in claim 4, together with additional means for angularly adjusting the ledger blade in its own plane from the fulcrum thereof with relation to the axis of the cutter, to position the shearing edges of said pinking notch relative to the cutter tooth.

7. The combination defined in claim 4, wherein the supporting means for the ledger blade comprises a fixed guide and said tensioning device is mounted thereon and connected to the ledger blade to support the latter in an upwardly inclined position from the fulcrum thereof toward the cutter axis.

8. The combination defined in claim 6 together with an adjusting bar mounted on said guide and having knife edges rockably and slidably engaged by opposite side edges of the ledger blade, and means for transversely adjusting said bar on the guide to angularly adjust the ledger blade in its own plane from the fulcrum thereof and position the shearing edges of said pinking notch relative to the cutter tooth.

9. In pinking mechanism, a fixed guide member, a ledger blade longitudinally and transversely movable relative to said guide member and having shearing edges at one end defining a pinking notch, a toothed cutter mounted on said guide member for movement about a horizontally inclined axis and in cooperative relation with said pinking notch, said ledger blade at one side of said notch having a bearing fulcrum, a tensioning device mounted on the guide member and connected to the other end of said blade yieldingly maintaining bearing pressure of said fulcrum with the toothed cutter, and means adjustably mounted on the guide member and coacting with said blade to pivotally move the blade from said bearing fulcrum transversely of the guide member and position the shearing edges of the pinking notch relative to the cutter tooth.

10. The combination defined in claim 9, wherein said guide member is provided with longitudinal guideways for the ledger blade progressively increasing in depth from the toothed cutter to said tensioning device, said device supporting the blade in an upwardly inclined position from said bearing fulcrum with the direction of thrust pressure on the cutter substantially parallel with the inclined axis thereof.

11. In pinking mechanism, a guide member having a horizontally inclined bearing at one end and longitudinal guideways at opposite sides progressively increasing in depth from said bearing to the opposite end of said member, a ledger blade longitudinally movable in said guideways, a shaft journalled in said bearing, a toothed cutter on one end of said shaft intersecting said ledger blade, said blade having shearing edges defining a pinking notch for coaction with the cutter tooth and having a bearing fulcrum contacting said cutter, and a tensioning device mounted on the guide member and connected to said blade to support the same in the guideways in an upwardly inclined position from the cutter and maintain yielding thrust pressure of said bearing fulcrum on the cutter in a direction substantially parallel with the inclined axis of the cutter shaft.

12. The combination defined in claim 11, together with power actuated means drivingly connected with the cutter shaft and including means for transmitting axial thrust pressure to said shaft in opposition to the thrust bearing pressure of the ledger blade fulcrum on the toothed cutter.

13. In pinking mechanism, a ledger blade having shearing edges defining a pinking notch, a member having a peripheral surface and movable about a fixed axis in intersecting relation to said blade and having a pinking tooth coacting with the shearing edges of said notch, means supporting the blade for angular movement in its own plane including means urging the blade in one direction to contact one of said shearing edges with said peripheral surface on the cutter, and additional means coacting with said ledger blade to position the blade and limit frictional wear between said peripheral surface and the blade and maintain a predetermined coacting relationship between the shearing edges of the ledger blade and the pinking tooth.

14. In pinking mechanism, a toothed cutter, means mounting said cutter for rotation about a fixed axis, a longitudinally movable ledger blade having shearing edges defining a pinking notch and a part in bearing contact with the cutter substantially at the axis of rotation thereof, means yieldingly resisting movement of said blade from normal position relative to said cutter, and power actuated means drivingly connected with the cutter and including means for transmitting axial thrust pressure to said cutter in opposition to said yielding means.

15. In pinking mechanism, a ledger blade having shearing edges defining a pinking notch yieldingly mounted for both longitudinal movement and rocking action about the shearing edges of a coacting rotatable cutting member, and a rotatable cutting member movable in intersecting relation to said ledger blade and having a pinking tooth coacting with the shearing edges of said notch, said rotatable cutter having a peripheral portion in constant contact with one shearing edge of said ledger blade to prevent overriding of the shear edges.

16. As an article of manufacture, a pinking cutter, having a shaft portion, and a head portion, the head portion comprising a flange and at least one triangularly shaped pinking tooth projecting laterally therefrom, said flange and one side of said tooth having a common taper.

17. As an article of manufacture, a pinking cutter as defined in claim 16, one portion of said flange being adapted to act as a thrust member, a second thrust member in which are retained anti-friction elements disposed about the cutter shaft, the peripheries of said flange and of the second thrust member having a common taper, both being adapted to be in constant bearing engagement with a portion of the shearing edge of the ledger blade.

18. In pinking mechanism, a guide member having a horizontally inclined bearing and longitudinal guideways at opposite sides, a ledger blade longitudinally and transversely movable in said guideways, a shaft journalled in said bearing, a toothed cutter on one end of said shaft intersecting said ledger blade, said blade having shearing edges defining a pinking notch for coaction with the cutter tooth and having a bearing fulcrum contacting said cutter, a tensioning device mounted on the guide member and connected to said blade to maintain yielding thrust pressure of said bearing fulcrum on the cutter, and means adjustably mounted on the guide member and co-acting with said blade to pivotally move the blade about said bearing fulcrum and to position the shearing edges of the pinking notch relative to the cutter tooth.

19. The combination defined in claim 18, together with a deflecting member surrounding said shaft between the bearing and toothed cutter, and having means slidably coacting with the ledger blade to prevent rotation of said member about the shaft axis.

20. The combination defined in claim 19, with means to prevent direct frictional contact between said deflecting member and the toothed cutter.

21. The combination defined in claim 18, together with an anti-friction radial and thrust bearing interposed between the shaft bearing and the toothed cutter.

22. The combination defined in claim 18, together with drive means for the cutter shaft including coacting gear elements operative to transmit axial thrust to said shaft in opposition to the thrust bearing pressure of the ledger blade fulcrum on the toothed cutter.

23. In pinking mechanism, a fixed guide member, a ledger blade longitudinally and transversely movable relative to said guide member and having shearing edges at one end defining a pinking notch, a toothed cutter mounted on said guide member for movement about a horizontally inclined axis and in cooperative relation with said pinking notch, said ledger blade at one side of said notch having a bearing fulcrum, a tensioning device mounted on the guide member and connected to the other end of said blade yieldingly maintaining bearing pressure of said fulcrum with the toothed cutter, and means adjustably mounted on the guide member and coacting with said blade to limit the range of movement thereof and to position the shearing edges of the pinking notch relative to the cutter tooth.

24. As an article of manufacture, a rotatable pinking cutter having a head portion including at least one triangularly shaped pinking tooth projecting laterally therefrom, a portion on said head suited for bearing contact substantially at the axis of rotation of said head with a part of a coacting ledger blade, and a coaxial, peripheral, frusto-conical surface portion of said head in line with one shearing edge of said pinking tooth for maintaining a second constant bearing contact with one shearing edge of said ledger blade.

VICTOR J. SIGODA.

References Cited in the file of this patent

UNITED STATES PATENTS

| Number | Name | Date |
|---|---|---|
| Re. 9,112 | Bigelow | Mar. 9, 1880 |
| 187,064 | Stroop | Feb. 6, 1877 |
| 801,980 | Glover | Oct. 17, 1905 |
| 1,359,427 | Plummer | Nov. 16, 1920 |
| 1,909,346 | Gruman | May 16, 1933 |
| 1,956,677 | Gruman | May 1, 1934 |
| 2,093,071 | Brussell | Sept. 14, 1936 |
| 2,095,570 | Moulton | Oct. 12, 1937 |
| 2,097,336 | Moulton | Oct. 26, 1937 |
| 2,239,743 | Sigoda | Apr. 29, 1941 |
| 2,420,331 | Sigoda | May 13, 1947 |
| 2,540,355 | Sigoda | Feb. 6, 1951 |